United States Patent
Zhang et al.

(10) Patent No.: US 10,948,121 B2
(45) Date of Patent: Mar. 16, 2021

(54) SUPER-LONG THERMAL INSULATION STEEL JACKET PIPE AND MACHINING PROCESS THEREOF

(71) Applicant: SHINDA (TANGSHAN) CREATIVE OIL & GAS EQUIPMENT CO., LTD., Tangshan (CN)

(72) Inventors: Shujun Zhang, Tangshan (CN); Bin Zheng, Tangshan (CN); Jianliang Duan, Tangshan (CN); Jian Dong, Tangshan (CN); Yueqing Lin, Tangshan (CN); Xiang Liu, Tangshan (CN); Fengshou Shangguan, Tangshan (CN)

(73) Assignee: SHINDA (TANGSHAN) CREATIVE OIL & GAS EQUIPMENT CO., LTD., Tangshan (CN)

( * ) Notice: Subject to any disclaimer, the term of this patent is extended or adjusted under 35 U.S.C. 154(b) by 23 days.

(21) Appl. No.: 16/504,389

(22) Filed: Jul. 8, 2019

(65) Prior Publication Data
US 2020/0240571 A1    Jul. 30, 2020

(30) Foreign Application Priority Data
Jan. 29, 2019    (CN) .......................... 201910086536.2

(51) Int. Cl.
| | | |
|---|---|---|
| *F16L 59/065* | (2006.01) | |
| *C21D 6/00* | (2006.01) | |
| *C21D 8/10* | (2006.01) | |
| *C21D 9/14* | (2006.01) | |
| *C21D 9/50* | (2006.01) | |
| *C22C 14/00* | (2006.01) | |
| *C22C 38/00* | (2006.01) | |
| *C22C 38/02* | (2006.01) | |

(Continued)

(52) U.S. Cl.
CPC ............ *F16L 59/065* (2013.01); *B21D 39/00* (2013.01); *C21D 6/004* (2013.01); *C21D 6/005* (2013.01); *C21D 6/008* (2013.01); *C21D 8/105* (2013.01); *C21D 9/14* (2013.01); *C21D 9/50* (2013.01); *C22C 14/00* (2013.01); *C22C 38/001* (2013.01); *C22C 38/002* (2013.01); *C22C 38/02* (2013.01); *C22C 38/04* (2013.01); *C22C 38/42* (2013.01); *C22C 38/44* (2013.01); *C22F 1/183* (2013.01); *F16L 7/02* (2013.01); *C23F 11/173* (2013.01); *Y10T 29/49826* (2015.01)

(58) Field of Classification Search
CPC ............................... F16L 59/065; C21D 6/004
USPC ............................................................ 29/428
See application file for complete search history.

(56) References Cited

FOREIGN PATENT DOCUMENTS

| CN | 2643136 Y | 9/2004 |
|---|---|---|
| CN | 208090184 U | 11/2018 |

*Primary Examiner* — Weiping Zhu
(74) *Attorney, Agent, or Firm* — Wood Herron & Evans LLP

(57) ABSTRACT

A super-long thermal insulation steel jacket pipe and a machining process for making such a pipe are provided. The pipe is designed to exhibit good thermal insulation performance and corrosion resistance. An annular cavity of the pipe is in a vacuum state, and the pipe is internally provided with a support frame and filled with a phase change material. When the pipe is used for underground energy exploitation, temperature in a working steel pipe in the pipe can be effectively kept unaffected when external temperature decreases. The steel jacket pipe has long service life, and can greatly reduce costs of exploitation of petroleum and/or of an underground heat source, such as by reducing a heat loss in exploitation.

4 Claims, 1 Drawing Sheet

(51) Int. Cl.
*C22C 38/04* (2006.01)
*C22C 38/42* (2006.01)
*C22C 38/44* (2006.01)
*C22F 1/18* (2006.01)
*F16L 7/02* (2006.01)
*B21D 39/00* (2006.01)
*C23F 11/173* (2006.01)

SUPER-LONG THERMAL INSULATION STEEL JACKET PIPE AND MACHINING PROCESS THEREOF

CROSS-REFERENCE TO RELATED APPLICATION

This application claims priority to Chinese Patent Application No. 201910086536.2, filed Jan. 29, 2019. The above-mentioned patent application is incorporated herein by reference in its entirety.

TECHNICAL FIELD

The present invention relates to insulation pipe technologies, and more particularly, relates to a thermal insulation steel jacket pipe and the machining process for making such a pipe.

BACKGROUND

Currently, fire coal is used for heating in winter in most areas, and there is inevitably a loss of heating power during heating power transmission, and therefore consumption of fire coal increases sharply. With the continuous decrease of energy resources, reducing energy consumption has become one of problems to be resolved urgently.

Geothermal heat is heat energy contained in the earth. It has two different sources, one comes from an exterior of the earth, and the other comes from an interior of the earth. From the earth surface to the earth interior, impact of solar radiation gradually decreases, and to a specific depth, this impact disappears, temperature is unchanged all the year round, that is, the so-called "normal temperature layer" is reached. It can be seen from the normal temperature layer downwards that, impact of heat inside the earth on earth temperature gradually increases, and the heat energy from the earth interior is referred to as "internal heat." An increment of ground temperature when an underground depth is increased by 100 m or 1 km is referred to as a geothermal gradient. In view of development and utilization of geothermal energy resource, compared with other renewable energy sources, the geothermal energy resource has more development potential and is attracting increasing attention all over the world.

A geothermal resource is mainly applied to the following several aspects currently:

Geothermal power generation, which is a most direct manner of geothermal utilization. Principles of geothermal power generation and thermal power generation are the same, and they are that steam thermal energy in a turbine is transformed into mechanical energy, and then the mechanical energy drives a generator to generate electricity. A difference is that, unlike thermal power generation, geothermal power generation does not need a huge boiler and does not need to consume fuel, and energy used for geothermal power generation is geothermal energy. A process of geothermal power generation is a process in which underground heat energy is transformed into mechanical energy first and then the mechanical energy is transformed into electric energy. Currently, a heating medium that can be used by a geothermal power station is mainly natural steam and hot water underground.

Geothermal heating, which is a terrestrial heat utilization mode that ranks only second to geothermal power generation and in which geothermal energy is directly used for heating, supplying heat, and supplying hot water.

Application of geothermal energy in agriculture: geothermal water with suitable temperature is used to irrigate farmland, to make crops can early-mature and increase production of crops; geothermal water is used for fish-farming, fish fattening can be accelerated in 28° C. water, and a fish yield rate is increased; geothermal heat is used for greenhouse building, sprout cultivation, growing vegetables, and growing flowers; geothermal heat is used for heating a biogas digester, increasing a biogas yield, and the like.

Geothermal industrial utilization: geothermal water includes many valuable rare elements, radioactive elements, rare gases, and compounds such as bromine, iodine, boron, potassium, helium, heavy water, potassium salts, and the like, and is an indispensable raw material for national defense industry, atomic energy industry, chemical engineering industry, and agriculture.

Geothermal medical treatment and traveling: geothermal water has relatively high temperature, special chemical components, gas components, a small amount of biological active ions, radioactive substances, and the like, forms mineral mud in some geothermal areas, and has obvious medical treatment and health care effects on human body.

A geothermal energy resource has an extensive utilization value. To better use the geothermal resource, the following technical problems further need to be resolved: a low geothermal heat utilization, few exploitable geothermal resources, and high exploitation costs.

As a result of a limitation of current exploitation technologies, only shallow geothermal resources can be used. In an exploitation process, a thermal insulation effect of a tubular product is poor, which further reduces geothermal heat utilization and greatly affects exploitation and utilization of geothermal energy.

Similarly, during a process of underground petroleum exploitation, a thermal insulation effect of a pipe is poor, leading to an increase in difficulty in petroleum exploitation. Petroleum is also referred to as crude oil, which is brownish black combustible thick liquid exploited from deep underground. A freezing point of crude oil is approximately between −50° C. and 35° C. During an exploitation process, a thermal insulation effect of a pipe is poor, which easily leads to crude oil solidification in the exploitation pipe, and it is needed to timely heat the solidified crude oil to ensure smooth exploitation, which greatly increases costs and a period of petroleum exploitation. Therefore, during a petroleum exploitation process, a pipe with a good thermal insulation effect is also desired.

The Chinese Patent No. CN 2643136 Y (published on or about Sep. 22, 2004) describes a vacuum insulation pipe. An outer steel pipe is sleeved outside a working steel pipe. Several movable supports are fastened to the working steel pipe. Two ends of a fixed support are connected to the outer steel pipe and the working steel pipe, respectively. Thermal insulation cotton is filled between the working steel pipe and the outer steel pipe, and there is a vacuum state between the outer steel pipe and the working steel pipe. Vacuum thermal insulation improves thermal insulation performance of a tubular product. However, for a casing pipe with a relatively large length, the movable support cannot play support role well, and the outer steel pipe and the working steel pipe of this product are connected by relying on the fixed support.

When the product is used for underground work at a depth of thousands of meters, deformation is easily caused, leading to a failure of the fixed support and seriously shortening a service life of the pipe.

The Chinese Utility Model No. CN 208090184 U (published on or about Nov. 13, 2018) describes an insulation steel jacket pipe, including a working steel pipe, a PPR pipe sleeved outside the working steel pipe, and a protecting steel pipe sleeved outside the PPR pipe, where an airtight cavity is formed between the working steel pipe and the PPR pipe; a support frame configured to make the working steel pipe and the PPR pipe keep coaxial is disposed between the working steel pipe and the PPR pipe; and a heating element is further disposed on an outer wall of the working steel pipe. A PPR pipe is further disposed in the middle of the insulation steel jacket pipe, and the heating element is disposed on the outer wall of the working steel pipe, so as to implement an thermal insulation effect of the insulation steel jacket pipe. The steel pipe cannot be applicable to underground heat source exploitation work, and the addition of the PPR pipe may improve the thermal insulation effect to a specific extent. However, in a working environment with relatively high geothermal temperature, the PPR pipe is heated and deformed, and consequently, the thermal insulation effect is rapidly reduced.

Therefore, it would be desirable to provide a super-long thermal insulation steel jacket pipe that can be used for exploitation and development of underground geothermal resources and petroleum resources, and that has a good thermal insulation effect and long service life.

SUMMARY

To address the above-mentioned deficiencies in the art, a super-long thermal insulation steel jacket pipe and method of making the same are provided. Super long pipes with different specifications can be fabricated according to different working environments. A vacuum insulation layer is disposed in the pipe, and a vacuum degree can be kept continuously from being affected by underground pressure and temperature.

In one embodiment, the super-long thermal insulation steel jacket pipe includes a working steel pipe and an outer steel pipe, where the outer steel pipe is sleeved outside the working steel pipe, an annular cavity formed by a gap is reserved between the working steel pipe and the outer steel pipe; a support frame is disposed between the working steel pipe and the outer steel pipe; the annular cavity is a vacuum cavity, two ends of the outer steel pipe are tightened, a tightened part of the outer steel pipe is sealed with an outer wall of the working steel pipe through several seal rings, and the annular cavity is further filled with a phase-change material; the support frame is a spiral annular support frame or a C-shaped support frame; when the support frame is the spiral annular support frame, the spiral annular support frame is sleeved on an outer peripheral side of the working steel pipe, and is not in contact with the working steel pipe; and when the support frame is the C-shaped support frame, several C-shaped support frames wind the outer peripheral side of the working steel pipe at intervals.

In one aspect, the phase-change material is an organic phase change material, such as paraffin. The phase-change material is added to the annular cavity. This can effectively store heat, and release heat when temperature of an external environment is low, thereby increasing the insulation performance of the pipe.

In another aspect, the spiral annular support frame is not in contact with the working steel pipe, and tightly supports an inner wall of the outer steel pipe, so as to keep cut-through of the annular cavity in the pipe, facilitating vacuumizing treatment.

In a further aspect, the spiral annular support frame or the C-shaped support frame is made of an elastic material. Most conventional support frames are fixed supports made of a steel material, but no elastic material has been used as a support structure currently to fully support an outer steel pipe. To improve mechanical performance of the steel jacket pipe fabricated in the present invention during underground work, an elastic material is preferably selected as a support material, so as to buffer the damage caused by external mechanical force to the working steel pipe. The elastic material used in the present invention is rubber, in some embodiments.

In yet another aspect, the C-shaped support frames wind outside the working steel pipe at intervals, which is easy to install. In addition, the annular cavity is formed between adjacent C-shaped support frames, the working steel pipe, and the outer steel pipe. By using C-shaped supports with different orientations and opening sizes, the annular cavity can be kept cut through, which is convenient for vacuumizing treatment of the annular cavity.

In these embodiments, stability and thermal insulation performance of the steel jacket pipe are ensured, especially during working at an underground depth greater than 1000 meters, working environment pressure, temperature, and the like do not cause deformation of an end of the pipe. In some embodiments, solder sealing is further performed on the end of the steel jacket pipe.

To further improve a thermal insulation effect, a thickness of the annular cavity is set to be 2 mm to 7 mm. For the annular cavity, an excessively large thickness causes an increase in production costs, while an excessively small thickness cannot effectively ensure the insulation effect of the annular cavity. When the thickness of the annular cavity is set to 2 mm to 7 mm, an optimum insulation effect is achieved.

An anti-corrosion layer is prepared by coating anti-corrosion liquid. The anti-corrosion liquid is composed of the following components by weight parts: silicone oil 50-60, zinc powder 20-30, citric acid 1-3, epoxy resin 5-8, aluminum oxide 1-5, diatomite 1-5, and polyacrylamide 5-10. In a specific embodiment, the anti-corrosion liquid is composed of the following components by weight parts: silicone oil 55, zinc powder 25, citric acid 2, epoxy resin 6, aluminum oxide 3, diatomite 3, and polyacrylamide 8. The foregoing components of the anti-corrosion liquid are mixed evenly according to the proportion and then coated on an outer wall of the outer steel pipe, and an anti-corrosion layer with a thickness of 0.1 mm to 0.3 mm can be formed through layer-by-layer coating.

In one aspect, a length of the steel jacket pipe is 1000 m to 8000 m.

In another aspect, the working steel pipe and the outer steel pipe are made of any one or a combination of stainless steel, carbon steel, or titanium alloy.

In a further aspect, the thickness of the annular cavity is 2 mm to 7 mm.

Main components of stainless steel include the following by weight percentage: C 0.019%-0.020%, Si 0.49%-0.50%, Mn 1.25%-1.26%, P 0.022%, S 0.00005%, Ni 5.16%-5.17%, Cr 22.46%-22.52%, N 0.163%-0.180%, Cu 0.003%-0.006%, Mo 3.07%-3.09%, and Fe and inevitable impurities as balance. Tensile strength of stainless steel is greater than or equal to 655 MPa, yield strength is greater than or equal to 620 MPa, internal yield pressure can reach 89.3 MPa, and collapse pressure can reach 74.1 MPa.

Main components of carbon steel include the following by weight percentage: C 0.11%, Si 0.22%-0.24%, Mn 1.44%-1.5%, P 0.008%-0.012%, S 0.001%, Cr 0.58%-0.59%, Ni 0.14%, Cu 0.24%, Mo 0.15%-0.16%, and Fe and inevitable impurities as balance. Tensile strength of carbon steel is greater than or equal to 795 MPa, yield strength is greater than or equal to 760 MPa, internal yield pressure can reach 103.4 MPa, and collapse pressure can reach 86.2 MPa.

Titanium alloy is TA18 alloy, and main components of TA18 alloy include the following by weight percentage: Al 2.0%-3.5%, V 1.5%-3.0%, Fe 0.25%, C 0.05%, N 0.05%, H 0.015%, O 0.12%, and Ti and inevitable impurities as balance. Tensile strength of TA18 alloy is greater than or equal to 655 MPa, yield strength is greater than or equal to 620 MPa, internal yield pressure can reach 89.3 MPa, and collapse pressure can reach 74.1 MPa.

In another embodiment of the invention, a machining process of the super-long thermal insulation steel jacket pipe is provided, and the method specifically includes the following steps:

(1) cleaning a surface of a steel plate used by the working steel pipe, where cleaning is specifically performed in an ultrasonic cleaning tank for multiple times by using a surfactant (preferably, sodium dodecyl benzene sulfonate is used) and clear water; air-drying the cleaned steel plate, crimping the steel plate, and performing laser welding to form a pipe, where a surplus height of a welding seam needs to be strictly controlled during laser welding and cannot exceed 0.25 mm; since the laser welded steel plate has no inner burrs, no polishing is required; and it should be noted that for a super-long steel pipe, continuous working is required for welding; performing heat treatment on the welded steel pipe, where a preferable heat treatment process includes first heating at 700° C. to 1070° C. for 10 min to 40 min; then cooling in a reducing atmosphere, tempering at 550° C. to 720° C. to eliminate internal stress of the steel pipe; and adjusting toughness and hardness of the steel pipe, where the reducing atmosphere is hydrogen gas; and performing sizing and non-destructive testing on the heat-treated working steel pipe;

(2) making a spiral annular support frame sleeved on an outer peripheral side of a qualified working steel pipe or making C-shaped support frames wind the outer peripheral side of the working steel pipe at intervals, where the spiral annular support frame is not in contact with the working steel pipe;

(3) cleaning a surface of a steel plate used by the outer steel pipe; performing crimping while wrapping the working steel pipe whose outer surface is winded with the support frame, where the support frame is in close contact with the outer steel pipe; then performing laser seal welding to form a jacket pipe; performing heat treatment on the jacket pipe; and performing sizing and non-destructive testing on the fabricated outer steel pipe, where a thickness of an annular cavity formed between the outer steel pipe and the working steel pipe is 2 mm to 7 mm;

(4) placing a phase-change energy storage material in the annular cavity of the jacket pipe; then placing several rubber rings at a tightened end of the outer steel pipe for sealing, and performing vacuumizing treatment on the annular cavity to make the annular cavity become a vacuum cavity; and finally performing solder sealing on the end of the outer steel pipe; and (5) performing heat treatment on a steel jacket pipe fabricated in step (4) to eliminate stress that may be generated due to thermal expansion during actual underground work, where the heat treatment process includes heating the steel jacket pipe at 50° C. to 280° C. for 30 min to 60 min; air-cooling to room temperature; and coating anti-corrosion liquid outside the outer steel pipe, that is, obtaining the insulation steel jacket pipe in the present invention.

In one aspect, in step (5), before heat treatment of the steel jacket pipe fabricated in step (4), the steel jacket pipe needs to be first rolled into an S shape, to prevent a decrease in mechanical performance of the pipe when the pipe is installed for use.

The super-long thermal insulation steel jacket pipe in the present invention can be applied to exploitation of underground petroleum and an underground heat source, and can be used in working at an underground depth of 1000 m to 8000 m.

Embodiments of the present invention achieve the following beneficial effects. The super-long thermal insulation steel jacket pipe has relatively good thermal insulation performance and corrosion resistance. Because the pipe's annular cavity is in a vacuum state, and the pipe is internally filled with a phase change energy storage material, the thermal insulation performance of the working steel pipe can be fully ensured. When the pipe is used for underground energy exploitation, temperature in the working steel pipe in the pipe can be effectively kept unaffected when external temperature decreases. To avoid impact of pressure, temperature, and the like in underground work, the spiral annular support frame or C-shaped support frame used in the present invention supports the outer steel pipe, so as to keep cut-through of the annular cavity. The steel jacket pipe in the present invention has long service life, and greatly reduces costs of exploitation of petroleum and an underground heat source.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

Figure 1:
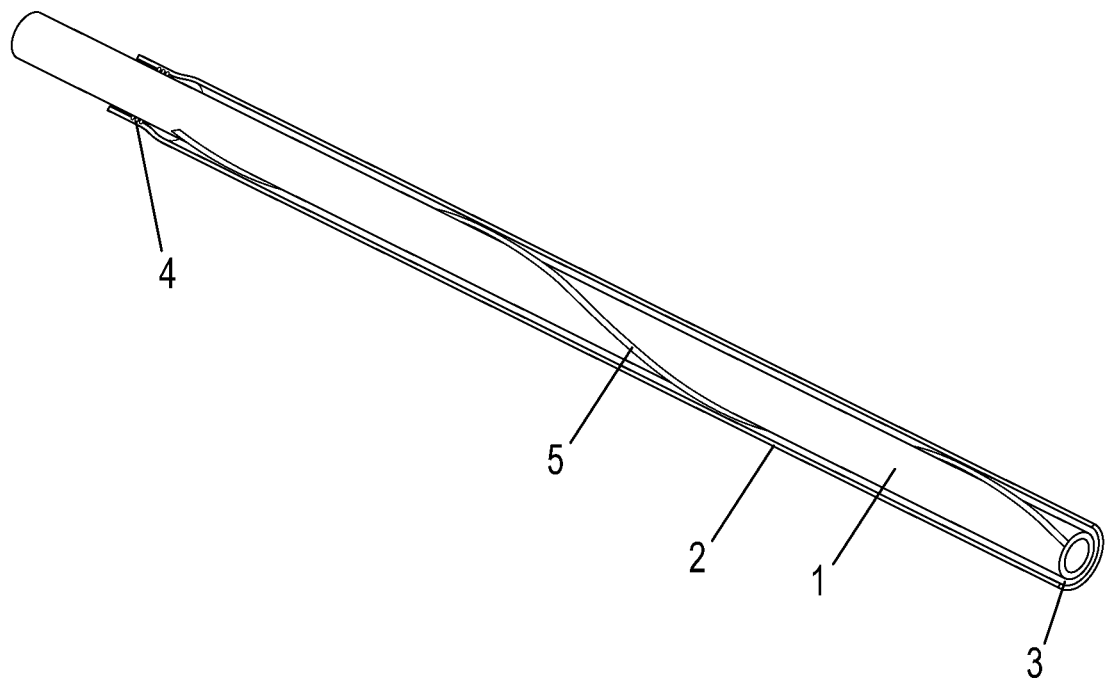
FIG. 1 is a schematic structural diagram of a side profile of a super-long thermal insulation steel jacket pipe according to one embodiment of the invention.

A super-long thermal insulation steel jacket pipe in accordance with one embodiment of the present invention is shown in FIG. 1, and includes a working steel pipe 1 and an outer steel pipe 2, where the outer steel pipe 2 is sleeved outside the working steel pipe 1, an annular cavity 3 formed by a gap is reserved between the working steel pipe 1 and the outer steel pipe 2; a support frame is disposed between the working steel pipe 1 and the outer steel pipe 2; the annular cavity 3 is a vacuum cavity, two ends of the outer steel pipe 2 are tightened, a tightened part of the outer steel pipe 2 is sealed with an outer wall of the working steel pipe 1 through several seal rings 4, and the annular cavity 3 is further filled with a phase-change material; the support frame is a spiral annular support frame 5, the spiral annular support frame 5 is sleeved on an outer peripheral side of the working steel pipe 1, and is not in contact with the working steel pipe 1.

Figure 2:
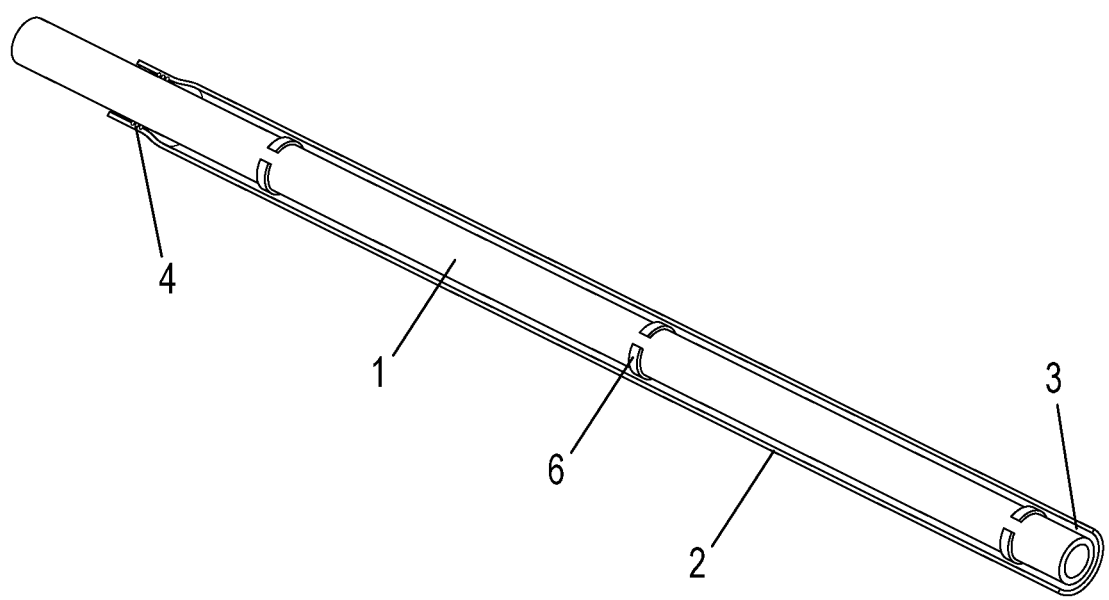
FIG. 2 is a schematic structural diagram of a side profile of a super-long thermal insulation steel jacket pipe according to another embodiment of the invention.

In some embodiments, a super-long thermal insulation steel jacket pipe in the present invention is shown in FIG. 2, and includes a working steel pipe 1 and an outer steel pipe 2, where the outer steel pipe 2 is sleeved outside the working steel pipe 1, an annular cavity 3 formed by a gap is reserved between the working steel pipe 1 and the outer steel pipe 2; a support frame is disposed between the working steel pipe 1 and the outer steel pipe 2; two ends of the outer steel pipe 2 are tightened, a tightened part of the outer steel pipe 2 is sealed with an outer wall of the working steel pipe 1 through several seal rings 4, and the annular cavity 3 is further filled with a phase-change material; and the support frame is a C-shaped support frame 6, and several C-shaped support frames 6 wind an outer peripheral side of the working steel pipe 1 at intervals.

In some embodiments, a thickness of the annular cavity of the super-long thermal insulation steel jacket pipe in the present invention is 2 mm to 7 mm.

In some embodiments, the spiral annular support frame or the C-shaped support frame of the super-long thermal insulation steel jacket pipe in the present invention is made of an elastic material, and is preferably made of rubber.

In some embodiments, the phase-change material of the super-long thermal insulation steel jacket pipe in the present invention is an organic phase-change material and is preferably paraffin.

The working steel pipe and the outer steel pipe of the steel jacket pipe in the present invention are made of any one or a combination of stainless steel, carbon steel, or titanium alloy.

With reference to specific examples, the following describes a process for fabricating the insulation steel jacket pipe in the present invention by using different combinations of steel materials.

Embodiment 1

Stainless steel is selected as a steel material of a working steel pipe, and main components of stainless steel include the following by weight percentage: C 0.019%, Si 0.49%, Mn 1.25%, P 0.022%, S 0.00005%, Ni 5.16%, Cr 22.46%, N 0.163%, Cu 0.003%, Mo 3.07%, and Fe and inevitable impurities as balance. Titanium alloy TA18 is selected as a steel material of an outer steel pipe, and main components of TA18 alloy include the following by weight percentage: Al 3.5%, V 1.5%-3.0%, Fe 0.25%, C 0.05%, N 0.05%, H 0.015%, O 0.12%, and Ti and inevitable impurities as balance. A 1000-meter insulation steel jacket pipe fabricated by using the foregoing selected steel materials (the two steel materials both have a length of 1000 meters) is shown in FIG. 1, and a specific fabrication process thereof includes the following steps.

(1) Clean a surface of a steel plate used by the working steel pipe, where cleaning is specifically performed in an ultrasonic cleaning tank for multiple times by using a surfactant (preferably, sodium dodecyl benzene sulfonate is used) and clear water; air-dry the cleaned steel plate, then crimp the steel plate, and perform laser welding to form a pipe, where an inner diameter of the pipe is 31 mm, a surplus height of a welding seam needs to be strictly controlled during laser welding and cannot exceed 0.25 mm (a height is preferably 0.20 mm); and it should be noted that welding is one-time continuous welding; perform heat treatment on the welded steel pipe, where a preferable heat treatment process includes first heating at 700° C. for 20 min; then cool in a reducing atmosphere, temper at 550° C. to eliminate internal stress of the steel pipe, and adjust toughness and hardness of the steel pipe; and perform sizing and non-destructive testing on the heat-treated working steel pipe.

(2) Make a spiral annular support frame sleeved on an outer peripheral side of a qualified working steel pipe, where the spiral annular support frame is not in contact with the working steel pipe, and the support frame is made of elastic rubber.

(3) Clean a surface of a steel plate used by the outer steel pipe; perform crimping while wrapping the working steel pipe whose outer surface is sleeved with the support frame to make the support frame tightly support an inner wall of the outer steel pipe; then perform laser seal welding to form a jacket pipe, where a thickness of an annular cavity between the outer steel pipe and the working steel pipe is 7 mm; perform heat treatment as described in step (1) on the jacket pipe obtained through welding, to improve mechanical performance of the outer steel pipe; and perform sizing and non-destructive testing on the fabricated the outer steel pipe.

(4) Place a phase-change energy storage material in the annular cavity of the jacket pipe; then place several rubber rings at a tightened end of the outer steel pipe for sealing, and perform vacuumizing treatment on the annular cavity to make the annular cavity become a vacuum cavity; and finally perform solder sealing on the end of the outer steel pipe.

(5) Roll, into an S shape, the steel jacket pipe fabricated in step (4), and then perform heat treatment on the steel jacket pipe to eliminate stress that may be generated due to thermal expansion during actual underground work, where the heat treatment process includes heating the steel jacket pipe at 50° C. for 60 min; air-cool to room temperature; and coat anti-corrosion liquid, where the anti-corrosion liquid is composed of the following components by weight parts: silicone oil 55, zinc powder 25, citric acid 2, epoxy resin 6, aluminum oxide 3, diatomite 3, and polyacrylamide 8. The foregoing components of the anti-corrosion liquid are mixed evenly according to the proportion and then coated on an outer wall of the outer steel pipe, and an anti-corrosion layer with a thickness of 0.1 mm can be formed through layer-by-layer coating. In this case, the 1000-meter insulation steel jacket pipe in the present invention is fabricated.

Embodiment 2

Titanium alloy TA18 is selected as a material for fabricating a working steel pipe, and main components of TA18 alloy include the following by weight percentage: Al 2.0%, V 1.5%, Fe 0.25%, C 0.05%, N 0.05%, H 0.015%, O 0.12%, and Ti and inevitable impurities as balance. Carbon steel is selected as a material for fabricating an outer steel pipe, and main components of carbon steel include the following by weight percentage: C 0.11%, Si 0.22%, Mn 1.44%, P 0.008%, S 0.001%, Cr 0.58%, Ni 0.14%, Cu 0.24%, Mo 0.15%, and Fe and inevitable impurities as balance. A 3000-meter insulation steel jacket pipe fabricated by using the foregoing selected steel materials (the two steel materials both have a length of 3000 meters) is shown in FIG. 2, and a specific fabrication process of the pipe includes the following steps.

(1) Clean a surface of a steel plate used by the working steel pipe, where cleaning is specifically performed in an ultrasonic cleaning tank for multiple times by using a surfactant (preferably, sodium dodecyl benzene sulfonate is used) and clear water; air-dry the cleaned steel plate, then crimp the steel plate, and perform laser welding to form a pipe, where an inner diameter of the pipe is 44.5 mm, a surplus height of a welding seam needs to be strictly controlled during laser welding and cannot exceed 0.25 mm (a height is preferably 0.20 mm); and it should be noted that welding is one-time continuous welding; perform heat treatment on the welded steel pipe, where a preferable heat treatment process includes first heating at 800° C. for 25 min; then cool in a reducing atmosphere, temper at 600° C. to eliminate internal stress of the steel pipe, and adjust toughness and hardness of the steel pipe; and perform sizing and non-destructive testing on the heat-treated working steel pipe.

(2) Make several C-shaped support frames wind an outer surface of a qualified working steel pipe at intervals, where the C-shaped support frame is made of elastic rubber.

(3) Clean a surface of a steel plate used by the outer steel pipe; perform crimping while wrapping the working steel pipe whose outer surface is winded with the support frame; then perform laser seal welding to form a jacket pipe, where a thickness of an annular cavity between the outer steel pipe and the working steel pipe is 5 mm; perform heat treatment as described in step (1) on the jacket pipe obtained through welding, to improve mechanical performance of the outer steel pipe; and perform sizing and non-destructive testing on the fabricated the outer steel pipe.

(4) Place a phase-change energy storage material in the annular cavity of the jacket pipe; then place several rubber rings at a tightened end of the outer steel pipe for sealing, and perform vacuumizing treatment on the annular cavity to make the annular cavity become a vacuum cavity; and finally perform solder sealing on the end of the outer steel pipe.

(5) Roll, into an S shape, the steel jacket pipe fabricated in step (4), and then perform heat treatment on the steel jacket pipe to eliminate stress that may be generated due to thermal expansion during actual underground work, where the heat treatment process includes heating the steel jacket pipe at 150° C. for 30 min; air-cool to room temperature; and coat the anti-corrosion liquid in Embodiment 1. In this case, the 3000-meter insulation steel jacket pipe in the present invention is fabricated.

Embodiment 3

Carbon steel is selected as a material for fabricating a working steel pipe, and main components of carbon steel include the following by weight percentage: C 0.11%, Si 0.24%, Mn 1.5%, P 0.012%, S 0.001%, Cr 0.58%, Ni 0.14%, Cu 0.24%, Mo 0.16%, and Fe and inevitable impurities as balance. Stainless steel is selected as a material for fabricating an outer steel pipe, and main components of stainless steel include the following by weight percentage: C 0.020%, Si 0.50%, Mn 1.26%, P 0.022%, S 0.00005%, Ni 5.17%, Cr 22.52%, N 0.163%, Cu 0.006%, Mo 3.07%-3.09%, and Fe and inevitable impurities as balance. A 5000-meter insulation steel jacket pipe is fabricated by using the foregoing selected steel materials (the two steel materials both have a length of 5000 meters), and a fabrication process of the pipe includes the following steps.

(1) Clean a surface of a steel plate used by the working steel pipe, where cleaning is specifically performed in an ultrasonic cleaning tank for multiple times by using a surfactant (preferably, sodium dodecyl benzene sulfonate is used) and clear water; air-dry the cleaned steel plate, then crimp the steel plate, and perform laser welding to form a pipe, where an inner diameter of the pipe is 31.8 mm, a surplus height of a welding seam needs to be strictly controlled during laser welding and cannot exceed 0.25 mm (a height is preferably 0.20 mm); and it should be noted that welding is one-time continuous welding; perform heat treatment on the welded steel pipe, where a preferable heat treatment process includes first heating at 900° C. for 30 min; then cool in a reducing atmosphere (preferably, hydrogen gas is used), temper at 650° C. to eliminate internal stress of the steel pipe, and adjust toughness and hardness of the steel pipe; and perform sizing and non-destructive testing on the heat-treated working steel pipe.

(2) Make a spiral annular support frame sleeved on an outer peripheral side of a qualified working steel pipe, where the spiral annular support frame is not in contact with the working steel pipe, and the support frame is made of elastic rubber.

(3) Clean a surface of a steel plate used by the outer steel pipe; perform crimping while wrapping the working steel pipe whose outer surface is sleeved with the support frame, where the support frame tightly supports an inner wall of the outer steel pipe; then perform laser seal welding to form a jacket pipe, where a thickness of an annular cavity between the outer steel pipe and the working steel pipe is 2 mm; perform heat treatment as described in step (1) on the jacket pipe obtained through welding, to improve mechanical performance of the outer steel pipe; and perform sizing and non-destructive testing on the fabricated the outer steel pipe.

(4) Place a phase-change energy storage material in the annular cavity of the jacket pipe; then place several rubber rings at a tightened end of the outer steel pipe for sealing, and perform vacuumizing treatment on the annular cavity to make the annular cavity become a vacuum cavity; and finally perform solder sealing on the end of the outer steel pipe.

(5) Roll, into an S shape, the steel jacket pipe fabricated in step (4), and then perform heat treatment on the steel jacket pipe to eliminate stress that may be generated due to thermal expansion during actual underground work, where the heat treatment process includes heating the steel jacket pipe at 200° C. for 30 min; air-cool to room temperature; and coat the anti-corrosion liquid in Embodiment 1. In this case, the 5000-meter insulation steel jacket pipe in the present invention is fabricated.

Embodiment 4

Titanium alloy TA18 is selected as a material for fabricating a working steel pipe and an outer steel pipe, and main components of TA18 alloy include the following by weight percentage: Al 3.5%, V 3.0%, Fe 0.25%, C 0.05%, N 0.05%, H 0.015%, O 0.12%, and Ti and inevitable impurities as balance. An 8000-meter insulation steel jacket pipe is fabricated by using the foregoing selected steel materials (the two steel materials both have a length of 5000 meters). The pipe is fabricated according to the process in Embodiment 1, and only the heat treatment process of the steel jacket pipe in step (5) is changed, and the heat treatment process in step (5) specifically includes: heating the steel jacket pipe at 280° C. for 60 min, air-cooling to room temperature, and coating the anti-corrosion liquid in Embodiment 1. In this case, the 8000-meter insulation steel jacket pipe in the present invention is fabricated.

The insulation steel jacket pipes each fabricated in Embodiment 1 to Embodiment 4 of the present invention are used to perform a test operation to simulate heat source exploitation in an underground working environment. Temperature of extracted water is set to 250° C., 200° C., 150° C., and 100° C., respectively. The 1000-meter steel jacket pipe fabricated in Embodiment 1 is used to extract a 100° C. water source, an environment outside the pipe is simulated to be an environment at temperature of 1000 meters underground to the land surface (it is specified that the pipe is placed into the 1000 meters underground to extract the 100° C. water source), step heating is performed on the pipe until temperature of a top end of the pipe is room temperature. Similarly, the 3000-meter steel jacket pipe fabricated in Embodiment 2 is used to extract a 150° C. water source; the 5000-meter steel jacket pipe fabricated in Embodiment 3 is used to extract a 200° C. water source; and the 8000-meter steel jacket pipe fabricated in Embodiment 4 is used to extract a 250° C. water source. It can be found by detecting temperature of a water source extracted from a pipe outlet, that temperature of the water source extracted by the 1000-meter steel jacket pipe fabricated in Embodiment 1 is 98° C., temperature of the water source extracted by the 3000-meter steel jacket pipe fabricated in Embodiment 2 is 142° C., temperature of the water source extracted by the 5000-meter steel jacket pipe fabricated in Embodiment 3 is 190° C., temperature of the water source extracted by the 8000-meter steel jacket pipe fabricated in Embodiment 4 is 242° C. It can be learned from the foregoing that the super-long thermal insulation steel jacket pipes have very good thermal insulation performance, and it can be found through detection of a tested steel jacket pipe that no obvious mechanical deformation occurs on a working steel pipe or an outer steel pipe in the pipe.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A machining process for producing a super-long thermal insulation steel jacket pipe, comprising:
   (1) cleaning a surface of a steel plate used to define a working steel pipe; performing crimping and laser welding; performing heat treatment after the working steel pipe is obtained through welding; and performing sizing and non-destructive testing on the working steel pipe;
   (2) making a support frame defined by one of the following: a spiral annular support frame sleeved on an outer peripheral side of the working steel pipe, and C-shaped support frames that wind the outer peripheral side of the working steel pipe at intervals, wherein the spiral annular support frame is not in contact with the working steel pipe;
   (3) cleaning a surface of a steel plate used to define an outer steel pipe; performing crimping while wrapping the working steel pipe whose outer surface is provided with the support frame, wherein the support frame tightly supports an inner wall of the outer steel pipe; then performing laser seal welding to form a jacket pipe; performing heat treatment on the jacket pipe; and performing sizing and non-destructive testing on the fabricated outer steel pipe, wherein a thickness of an annular cavity between the outer steel pipe and the working steel pipe is 2 mm to 7 mm;
   (4) placing a phase-change energy storage material in the annular cavity of the jacket pipe; then placing several rubber rings at a tightened end of the outer steel pipe for sealing, and performing vacuumizing treatment on the annular cavity to make the annular cavity become a vacuum cavity; and finally performing solder sealing on the tightened end of the outer steel pipe; and
   (5) performing heat treatment at 50° C. to 280° C. for 30 min to 60 min on a steel jacket pipe fabricated in step (4), cooling, and coating anti-corrosion liquid outside the steel jacket pipe, that is, obtaining the insulation steel jacket pipe.

2. The machining process of claim 1, wherein a heat treatment process in step (1) and (2) comprises:
   heating, at 700° C. to 1070° C. for 10 min to 40 min, the outer steel pipe and the working steel pipe formed through welding, and
   then cooling in a reducing atmosphere, tempering at 550° C. to 720° C. to eliminate internal stress of the outer steel pipe and the working steel pipe, and thereby adjusting toughness and hardness of the outer steel pipe and the working steel pipe.

3. The machining process of claim 1, wherein during laser welding of the steel plates for forming the outer steel pipe and the working steel pipe in step (1) and (3), a surplus height of a welding seam is less than or equal to 0.25 mm.

4. The machining process of claim 1, wherein in step (5), before heat treatment of the steel jacket pipe fabricated in step (4), the steel jacket pipe is first rolled into an S shape.

* * * * *